3,598,563
PARTICULATE FERTILIZER AND METHOD
Wendell D. Burch, Ponca City, Okla., assignor to
Continental Oil Company, Ponca City, Okla.
No Drawing. Filed Apr. 29, 1968, Ser. No. 725,191
Int. Cl. C05f 11/00
U.S. Cl. 71—25    5 Claims

ABSTRACT OF THE DISCLOSURE

Water-soluble fertilizer particles of reduced hygroscopicity and nutrient release rate result from a first coating of a blend of petroleum residue and air-blown petroleum residue, a second coating of a parting agent, and a third coating of conditioning agent.

---

This invention relates to particulate plant nutrient of improved moisture resistance and nutrient release rate. In one aspect, the invention relates to fertilizer particles coated with a novel asphaltic composition which in turn is coated with a parting agent. In another aspect, the invention relates to fertilizer particles having a first asphaltic coating, a second parting agent coating, and a final conditioning agent coating.

It has long been known to provide coatings of various natures on particulate fertilizer, particularly fertilizers of a hygroscopic nature. Such coatings would ideally serve at least three functions, viz. as a parting agent to prevent individual particles from adhering to each other, as a moisture barrier to prevent stored hygroscopic particles from being physically disintegrated, and as a release control to permit the nutrient values to be gradually released into the soil. However, coatings of the prior art have either been deficient in one or more of these functions, or have been so expensive to produce as to be economically impractical.

According to the present invention, particulate fertilizer is coated with two, and preferably three, defined layers to provide a product which has excellent release rate, moisture resistance, and anti-caking properties. The first or innermost coating comprises an essentially continuous film of a two-component blend, a heavy petroleum residue and an air-blown heavy petroleum residue. The second coating comprises a discontinuous layer of a parting agent, and the third layer, when used, comprises a discontinuous layer of a conditioning agent.

The coatings of this invention can be applied to any solid particulate fertilizer, although they will be most beneficial for a hygroscopic material such as urea or ammonium nitrate. Other solid fertilizers, such as nitrates, phosphates, and blends, can of course be treated by the present invention. The preferred particle form is approximately spherical, for ease in treating and handling, but it will be understood that other particle forms, such as crystals, amorphous chunks, or other granules can be used. Suitable particle size is determined by the market, and typically runs mesh or smaller, although the invention is operable on larger particles.

As stated, the fertilizer particles are first coated with a blend of heavy petroleum residue and air-blown heavy petroleum residue. These materials are used in a ratio of air-blown residue to residue of about 1:1 to about 5:1 on a weight basis, and preferably about 2:1. Suitable air-blown residual materials will have a softening point between about 90 and about 275° F., and preferably about 135-145° F., and are obtained by air-blowing residual hydrocarbons, as known in the art. Hydrocarbons suitable for air-blownig include clarified oil and cracked gas oil bottoms. Suitable materials for use as the second component, i.e. the heavy petroleum residue, include bright stock, clarified oil, coal tar oil, cracked gas oil residue, and heavy oxygenated compounds such as alcohols of 20-24 carbon atom chain length. The blend of the two components is applied to the particles, depending on particle size, in an amount between about 5 to about 50 parts by weight fertilizer per part blend, and preferably about 14:1. This coating blend is applied by heating it to about 120-400° F., preferably at least about 250° F., and mixing it with the fertilizer particles, which in turn are preferably pre-heated to about 100-240° F., preferably about 180° F. Although the first coating has been described as comprising a blend of the two components, the first coating can less preferably be made by adding each of the two components separately, in either order and in the noted amounts; with sufficient mixing, a blend can be achieved on the particles, although abviously two two components are easier blended prior to addition to the particles. After a suitable amount of mixing, i.e. sufficient to obtain uniformity, the mass is cooled to within about ±20° F. of the softening point of the initial air-blown residue component, most preferably to about 10° F. above said softening point. The parting agent coating is then applied.

Parting agent is a very finely divided solid, as is known in the art, and can comprise such materials as diatomaceous earth, coal, charcoal, talc. sulfur, air-blown heavy petroleum residue of a softening point of 200° F. or higher, gypsum, limestone, fly ash, stack dust, hydrous aluminum silicate, phosphate rock, kaolin clay, attapulgite clay, bentonite clay, or bauxite clay. The preferred parting agent is talc. The parting agent, a stated, is applied to the particles when they are at a temperature near the softening point of the air-blown asphalt component, and is used in an amount between about 10 to about 50 parts by weight of fertilizer to one of parting agent, preferably about 18. This material can be applied by a simple mixing with the once-coated fertilizer particles. Parting material, although referred to as a second layer or coating, is discontinuous, and it has surprisingly been found that the best products formed according to this invention actually contain parting agent particles not only embedded in the surface of the first coating, but actually covered over with oily film therefrom. The product of this step is a highly moisture resistant, non-burning fertilizer suitable for use after cooling. However, it has also been found desirable to apply a third coating to the particles after they have cooled to ambient temperature in order to improve the handling characteristics, the third coating being a conditioning agent.

The conditioning agent is also a very finely divided solid, and can comprise any of the materials named as parting agents. Surprisingly, however, it has been found that, when the herein-preferred parting agent, talc, is used, the preferred conditioning agent is not talc, but rather is fly ash; this combination provides much greater moisture resistance than when talc, for example, is used as both the parting and the conditioning agent. Although parting agents and conditioning agents are the same type materials, the fact that they are applied to the fertilizer particle at different temperature levels results in their having different effects on the product. Conditioning agent is used in an amount between about 10 and about 90 parts by weight fertilizer per part of conditioning agent, and preferably about 45 parts per part. Conditioning agent can be applied to the coated fertilizer particles by simple mixing at about ambient temperature.

The invention will now be further explained by the following examples, which are presented as illustrative and not limiting.

EXAMPLE I 178 parts by weight of prilled urea was heated to 180° F., and a blend of 4 parts synthetic tower bottoms (STB) and 8 parts air-blown clarified oil of 139° F. softening point (ABCO) was heated to 250° F. The air-blown clarified oil, which can be made by air-blowing the bottoms from distillation of recycle product of catalytic cracking of petroleum, had the following additional properties: specific gravity at 60° F., about 1.115; viscosity at 300° F., about 40 cp.; and needle penetration at 77° F. and 100 g./5 sec., about 0–5. The STB used in the examples was bottoms from fractionating a catalytically cracked (TCC) gas oil, and had the following properties: API gravity, 16.4; IBP (at 10 mm. Hg), 196° F.; 50% point (at 10 mm. Hg), 560° F.; end point (at 10 mm. Hg), 708° F.; viscosity SSU at 100° F., 232.8, at 210° F., 45.5; calculated average molecular weight, 400: UOP "K" factor, 11.46; and flash point, 134° F. The STB–ABCO blend was poured over the urea, and the mass was stirred until the mixture was uniform. The mass was then cooled to 150° F., and 10 parts of talc was poured over the mass. The mixture was stirred until it cooled to 120° F. The talc acted to part or separate the individual particles of the mass, and the product consisted of individual prills of coated urea.

EXAMPLE II 98 g. of the product of Example I was mixed at ambient temperature (about 72° F.) with 2 g. of fly ash.

EXAMPLE III 95 g. of the product of Example I was mixed at ambient temperature with 5 g. of talc.

EXAMPLE IV 180 parts by weight of prilled urea was heated to 180° F., and 10 parts of ABCO was heated to 250° F. The ABCO was poured over the urea, and the mixture stirred until uniform. The mass was cooled to 150° F., and 10 parts talc was added. The mixture was stirred while cooling to 120° F.

EXAMPLE V

The procedure of Example I was followed, except that attapulgite clay was substituted for the talc.

EXAMPLE VI

The procedure of Example I was followed, except that 182 parts urea and 6 parts talc were used.

EXAMPLE VII

The procedure of Example I was followed, except that 168 parts urea and 20 parts talc were used.

Results

The products of the various examples, and a sample of uncoated urea prills as a control, were exposed to a humidity chamber for 16 hours at 90° F. and 85% RH. Percent weight gained is tabulated:

| Material: | Percent weight gain |
|---|---|
| Urea control | 101.7 |
| Example I | 1.1 |
| Example II | 1.3 |
| Example III | 17.4 |
| Example IV | 33.1 |
| Example V | 16.9 |
| Example VI | 0.7 |
| Example VII | 5.7 |

Various of the products were tested for percent burn, relative to uncoated urea prills, 6 days after application to ryegrass. The results are tabulated:

| Material: | Percent burn, relative to control |
|---|---|
| Urea control | 100 |
| Example I | 2 |
| Example II | 2 |
| Example III | 75 |
| Example IV | 75 |

Tendency to cake during storage was observed qualitatively, and it was noted that the products of Examples II and III had less tendency to cake than that of Example I. Comparison of the materials of Examples II and III show talc to be inferior to fly ash as a conditioning agent, in that it has poor moisture resistance and anti-burning properties. Example IV shows the desirability of including a heavy residue in the initial coating blend, Example V shows the advantage of talc as a parting agent, and Examples VI and VII show that about 5 weight percent talc as the parting agent is optimum.

While particular embodiments of the invention have been described, it will be understood, of course, that the invention is not limited thereto, since many modifications may be made; and it is, therefore, contemplated to cover by the appended claims any such modifications as fall within the true spirit and scope of the invention.

What is claimed is:

1. The method of producing particulate fertilizer of reduced hygroscopicity which comprises:
   (a) heating said fertilizer particles to about 100–240° F.,
   (b) coating said heated particles with about 7 weight percent of a blend comprising about ⅔ air-blown clarified oil with the balance being bottoms from a catalytically cracked gas oil, said blend being heated to at least about 250° F.,
   (c) cooling the resulting mass to within about ±20° F. of the softening point of said air-blown clarified oil,
   (d) mixing with the cooled mass about 5–6 weight percent talc based on fertilizer,
   (e) further cooling the resulting mass to about ambient temperature, and
   (f) mixing with the thus-cooled mass about 2 weight percent fly ash based on fertilizer.

2. A particulate fertilizer comprising fertilizer particles having thereon a first coating in an amount between about 2 and about 20 weight percent coating based on fertilizer, said first coating comprising a blend of about 16 to about 50 weight percent of a heavy petroleum residue with the balance being an air-blown heavy petroleum residue, a second discontinuous coating of a parting agent in amount between about 2 and about 10 weight percent based on fertilizer, and about 2 weight percent fly ash conditioning agent.

3. A particulate fertilizer comprising fertilizer particles having thereon about 7 weight percent of a first coating based on fertilizer, said first coating comprising about ⅔ air-blown clarified oil having a softening point of about 135–145° F. with the balance being bottoms from a catalytically cracked gas oil having an IBP at 10 mm. Hg of about 196° F., a second discontinuous coating of about 5–6 weight percent talc parting agent based on fertilizer, and a further coating comprising about 2 weight percent fly ash conditioning agent based on fertilizer.

4. A particulate fertilizer comprising fertilizer particles having thereon a first coating in an amount between about 2 and about 20 weight percent coating based on fertilizer, said first coating comprising a blend of about 16 to about 50 weight percent of a heavy petroleum residue with the balance being an air-blown heavy petroleum residue, a second discontinuous coating of a parting agent in amount between about 2 and about 10 weight percent based on fertilizer, and a further coating comprising a conditioning agent present to the extent of about 1 to about 10 weight percent based on fertilizer.

5. A particulate fertilizer comprising fertilizer particles having thereon a first coating in an amount of about 7 weight percent coating based on fertilizer, said first coating comprising a blend of about ⅔ air-blown clarified oil having a softening point of about 135–145° F. with the balance being bottoms from a catalytically cracked gas oil having an IBP at 10 mm. Hg of about 196° F., a second discontinuous coating of talc in the amount of about 5–6 weight percent based on fertilizer, and a further coating comprising a conditioning agent present to the extent of about 1 to about 10 weight percent based on fertilizer.

References Cited

UNITED STATES PATENTS

| | | | |
|---|---|---|---|
| 2,995,433 | 8/1961 | Goren et al. | 71—25 |
| 3,110,583 | 11/1963 | Richardson | 71—25 |
| 3,295,950 | 1/1967 | Blovin et al. | 71—28 |
| 3,300,293 | 1/1967 | Bozzelli et al. | 71—28 |
| 3,325,276 | 6/1967 | Feller | 71—59 |
| 3,368,929 | 2/1968 | Bell | 71—59 |

FOREIGN PATENTS

| | | | |
|---|---|---|---|
| 708,126 | 4/1965 | Canada | 71—28 |

REUBEN FRIEDMAN, Primary Examiner

C. N. HART, Assistant Examiner

U.S. Cl. X.R.

71—28, 64